United States Patent [19]
Harrell

[11] 4,008,589
[45] Feb. 22, 1977

[54] IGNITION SWITCH SECURITY SHIELD PROTECTION AGAINST CAR THEFT

[76] Inventor: Washington Harrell, 143-18 182nd Place, Springfield Gardens, N.Y. 11413

[22] Filed: Feb. 2, 1976

[21] Appl. No.: 654,723

[52] U.S. Cl. .................................. 70/424; 70/18; 70/237
[51] Int. Cl.² .................................. E05B 17/14
[58] Field of Search ............. 70/18, 178, 183, 211, 70/212, 237, 423, 424, 427

[56] References Cited
UNITED STATES PATENTS 3,811,303  5/1974  Robertson .................. 70/237

Primary Examiner—Robert L. Wolfe
Attorney, Agent, or Firm—Richard L. Miller

[57] ABSTRACT

A shackle is provided with a hollow base portion and a pair of brackets projecting from the base portion. The hollow base portion fits over the ignition switch mounted on a steering post of an automobile and is secured in place by a chain having an end secured to each of the brackets. A bolt having an enlarged head mounts one of the ends of the chain to one of the brackets via a nut welded to the inner surface of the bracket so that the chain is adjustable in length to fit variously-sized steering posts.

6 Claims, 3 Drawing Figures

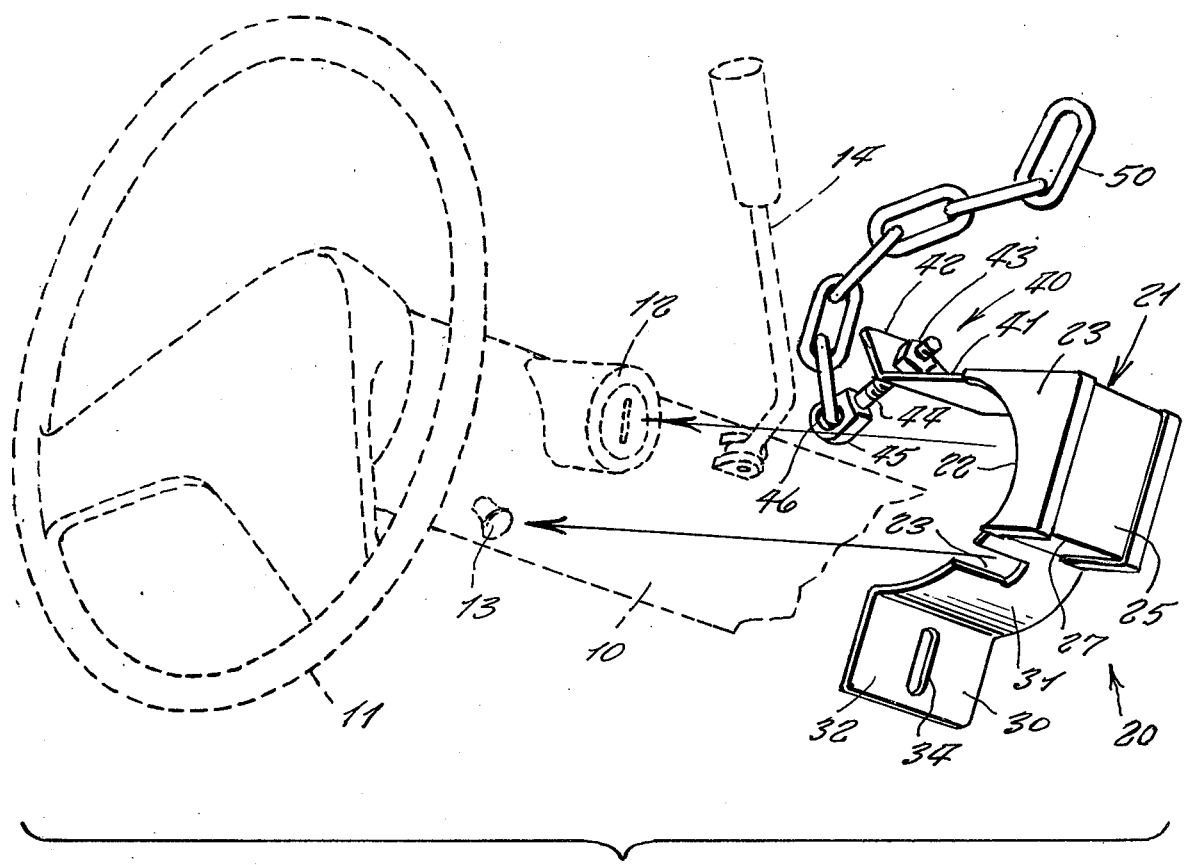
Fig. 1
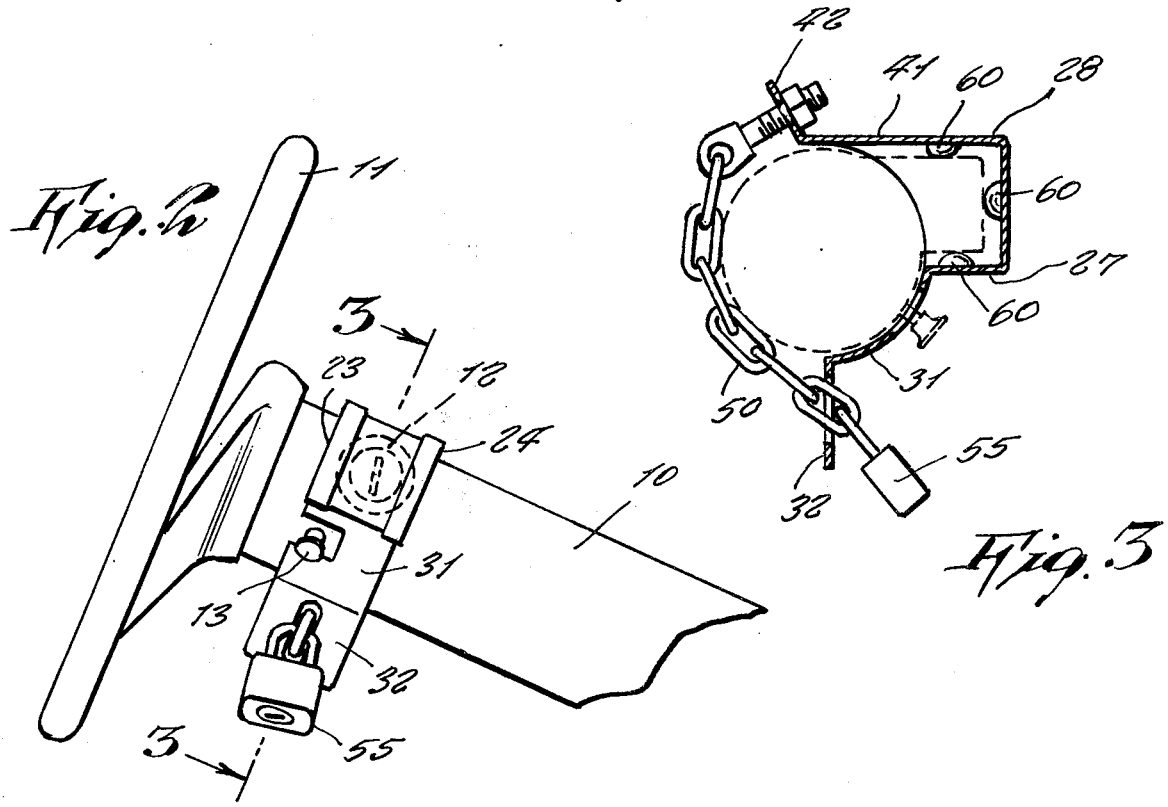
Fig. 2
Fig. 3

IGNITION SWITCH SECURITY SHIELD PROTECTION AGAINST CAR THEFT

BACKGROUND OF THE INVENTION

The present invention is directed to a security shield for automobile ignition switches for the prevention of automobile theft. Security shields or locks for ignition switches are known but all prior art devices suffer from numerous drawbacks such as the costlines of manufacture, lack of fit to various-sized steering posts, and difficulty of handling.

SUMMARY OF THE INVENTION

It is, therefore, the primary object of the present invention to provide a security shield for an ignition switch of an automobile or the like that is easily handleable, inexpensive to produce, and capable of fitting differently-sized steering posts.

To this end, the security shield of the present invention is made up of a metal shackle that partially surrounds a portion of the steering post of the steering mechanism of an automobile, or the like, and which is readily secured in place around any-sized steering post by an adjustable chain. The adjustable chain is secured to one bracket of the metal shackle by a threaded anchor member which is threadably received by a nut welded to the inner surface of the bracket. Another bracket is provided which has an elongated opening therein for the reception therethrough of the other end of the adjustable chain, which is locked in place by a padlock.

The metal shackle fits over that portion of the steering post having the ignition switch projecting therefrom, and also has a cut-out for the passage therethrough of a signal light switch also mounted on the steering post. Other cut-outs or openings may be provided on the metal shackle for the allowance of other switches and the like projecting from the stem post to thereby allow access and use of these switches while the ignition switch is securely protected by the metal shackle of the present invention.

BRIEF DESCRIPTION OF THE DRAWINGS

The invention will be more readily understood with reference to the following detailed description when taken in conjunction with the accompanying drawings, wherein:

FIG. 1 is a perspective view showing the security shield of the present invention in position for mounting to a steering post of an automobile or the like;

FIG. 2 is a side view showing the security shield of the present invention mounted and locked in position on a steering post of an automobile, or the like; and FIG. 3 is a cross-sectional view taken along line 3—3 of FIG. 2.

DETAIL DESCRIPTION OF THE INVENTION

Referring now to the drawing, there is shown a steering post 10 of an automobile or the like with the standard steering wheel 11 at one end thereof, an ignition switch 12 mounted on a portion of the steering post 10, and a signal light switch 13 also mounted on a portion of the steering post upstream of the ignition switch toward the steering wheel. An automatic gear shift lever 14 is also mounted on the steering post 10 downstream of the ignition switch 12.

The security shield for an ignition switch of the present invention is shown in FIG. 1 in a position ready for mounting to the steering post 10. The security shield is made up of a main portion or shackle 20 comprising a base portion 21 having inner curved surfaces 22 which is designed to engage with the portion of the steering post 10 on either side of the ignition switch 12. The base portion 21, and the rest of the shackle, is made of steel or other hard metal and comprises a hollowed portion between side walls 23, 24, base wall 25, and the curved surfaces 22 which are formed by the edge of the side walls 23, 24. The hollowed portion receives therein the ignition switch 12 when the shackle 20 is mounted on to the steering post 10. Projecting from one end wall 27, at the edge thereof, is a bracket 30 having a first curved portion 31 connected to the edge of the end wall 27 and a second straight portion 32 connected to one end of the first curved portion as shown in FIG. 1. The first curved portion 31 projects from the end wall 27 so that the inner surface thereof forms a continuously curved surface with the curved surfaces 22. The inner surface of the curved portion 31 surrounds a portion of the steering post 10 when the security shield of the present invention is mounted thereto and forms a continuously curved mating surface along with the curved surfaces 22. An opening or cut-out 33 is provided on the curved portion 31 in order to allow access to the signal light switch 13 when the shackle is mounted on the steering post. An elongated opening or slot 34 is provided on the straight portion 32 in order to allow a link of metal chain to pass therethrough and be secured by a padlock. The straight portion 31 of the bracket 30 flairs outwardly from the curved portion 31 away from the steering post 10 when mounted thereon in order to allow for the securing of the metal chain.

Another bracket 40 extends from the edge of end wall 28 and is comprised of a first straight portion 41 forming a continuance of the end wall 28 and has projecting at an angle therefrom an angle plate 42. The angle plate 42 is formed with a circular opening around which is welded a nut 43 for the reception therein of a threaded bolt 44. The bolt 44 has a head 45 with an opening 46 formed therein for the reception of one link of the metal chain 50. The metal chain 50 is preferably coated with plastic in order to achieve a more aesthetic appearance and in order to prevent scratching or other damage to the steering post 10. Since the nut 43 is welded to the angle plate 42, the rotation of the bolt 44 via the head 45 will cause the bolt to reciprocate within the opening of the angle bracket and thereby adjust the length of the metal chain 50 to a particularly sized steering post 10.

In using the device of the present invention, the base portion 21 is fitted about the portion of the steering post having the ignition switch 12 projecting therefrom so that the hollowed portion of the base portion 21 receives the ignition switch therein. The bracket 30 thereby forms a continuously curved surface with the base portion 21 which conforms to the outline of the steering post. After such placement of the base portion over the ignition switch 12, the bolt 44 is rotated via the head 45 so that the chain 50 is of proper length for the particularly-sized steering post being surrounded. After such adjustment has occurred, the end link or any other link of the chain 50 is inserted through the elongated opening 34 where it is secured in place by a padlock 55.

In order to insure that the metal shackle 20 does not damage or scratch the ignition switch 12, a plurality of small cushions 60 may be provided on the inner surfaces of the base wall 25 and each of the end walls 27, 28. Additional cushions may be provided on the inner surfaces of the side walls 23, 24. By choosing the proper length of the chain 50 by rotating the bolt 44, the security shield of the present invention may be mounted about the steering post with minimum contact therewith in order to avoid damage or scratching of the steering post.

While a specific embodiment of the invention has been shown and described, it is to be understood that numerous changes and modifications may be made without departing from the scope and spirit of the invention. For example, the bracket 30 may be pivoted to the base portion 21.

What is claimed is:

1. An ignition switch security shield comprising a base portion having a first side wall, a second side wall, a first end wall, a second end wall, and a base wall, each of said first and second sidewalls having one curved edge for mating engagement with a steering post of an automobile or the like, a first bracket extending from one edge of said first end wall and having a first curved portion and a second straight portion, said second straight portion having an opening therein for the reception of a link of a chain therethrough, a second bracket extending from one edge of said second end wall and having a straight portion projecting from said one edge of said second end wall, and an angle plate projecting from said straight portion, and means for securing said base portion, said first bracket, and said second bracket to a steering post of an automobile or the like, wherein said means for securing comprises a chain, a bolt having an enlarged head, said enlarged head having an opening formed therein for the reception and securement therein of a link of said chain, and a nut welded to the inner surface of said angle plate, said angle plate having an opening therein for the reception of said bolt therethrough so that said bolt may be rotated in said nut and thereby adjust the length of said chain.

2. The ignition switch security shield according to claim 1, wherein said chain is made of a metal, and comprises a coating of plastic.

3. The ignition switch security shield according to claim 1, wherein said first curved portion of said first bracket comprises a cut-out for the projection therefrom of a signal light switch mounted on the steering post of an automobile.

4. The ignition switch security shield according to claim 1, wherein said base portion is hollow so that an ignition switch mounted on a steering post of an automobile will be received therein when said ignition switch security shield is mounted on the steering post.

5. The ignition switch security shiled according to claim 1, wherein said base portion comprises a plurality of cushions projecting from at least one of said first and second end walls, said first and second said walls, and said base wall in order to cushion said ignition switch when said base portion is mounted on to the steering post of an automobile.

6. The ignition switch security shield according to claim 1, wherein said means for securing further comprises a padlock for locking a link of said chain in said opening of said second straight portion.

* * * * *